UNITED STATES PATENT OFFICE.

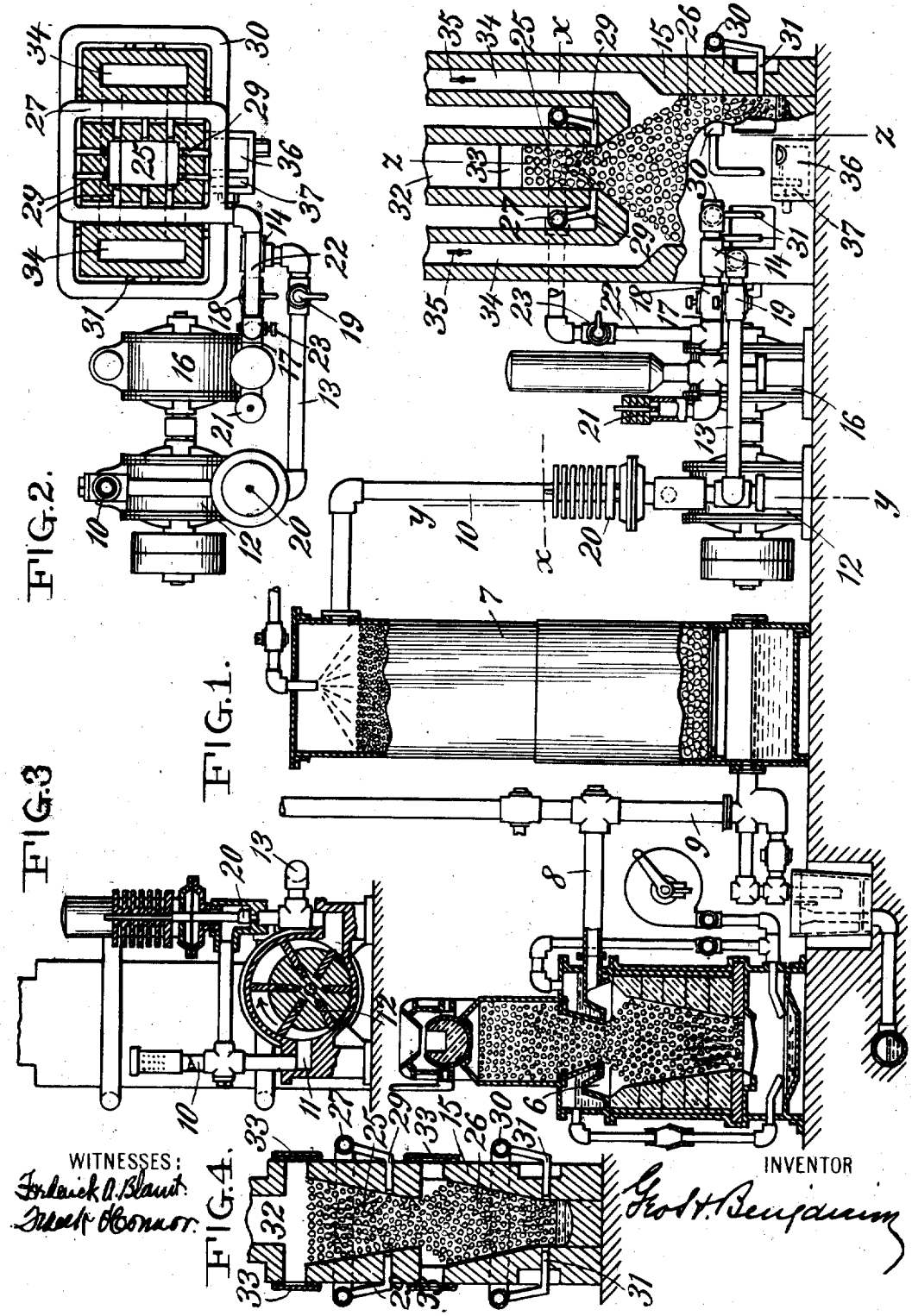

GEORGE HILLARD BENJAMIN, OF NEW YORK, N. Y.

METHOD OF SMELTING COPPER ORES.

No. 900,346.

Specification of Letters Patent.

Patented Oct. 6, 1908.

Application filed December 13, 1906. Serial No. 347,690.

*To all whom it may concern:*

Be it known that I, GEORGE HILLARD BENJAMIN, a citizen of the United States, residing in the city, county, and State of New York, have invented a Method of Smelting Copper Ores, of which the following is a specification.

My invention consists in a method of smelting copper ores.

The objects of my invention are: first: to do away with the use of solid fuel in a smelting furnace; second: to carry on simultaneously within a furnace structure the operation of separating the major portion of the sulfur from the ore, the oxidation of the iron and its combination with fluxing materials to form slag, and the reduction of the oxid of copper to metallic copper. Third: the production of a high grade metal at low cost.

Broadly stated, I attain the objects sought for by first subjecting the previously heated and fluxed copper ore to the action of an oxidizing gas under pressure, and subsequently the oxid of copper resulting from such treatment to the action of a reducing gas under pressure, the gas being of a character which will generate high temperature. Further, by reason of the construction of the furnace, both operations are carried on at the same time.

The accompanying drawings will serve to show one form of apparatus which may be employed in carrying my invention into effect, in which Figure 1 is an elevation and partial section taken through the gas producer, scrubber, pumps, and furnace; Fig. 2 is a plan view of the gas and air pumps, and a horizontal section of the furnace taken on the line X—X of Fig. 1; Fig. 3 is a vertical section on the line Y—Y of Fig. 1; and Fig. 4 is a vertical section through the lower portion of the furnace, taken on the line Z—Z of Fig. 1.

In the drawings: 6 indicates a gas producer of any suitable construction, preferably one that will deliver a gas high in carbon and hydrogen. The producer shown in the drawings is of the "Otto" type, which is so well known that further description is unnecessary.

7 is a scrubber to which the gas is delivered from the producer through pipes 8, 9. The scrubber may be omitted; its purpose is to purify the gas. The gas is delivered from the scrubber by the pipe 10 to the induction orifice 11 of the gas pump 12, and from the eduction orifice through pipe 13 to pipe 14 leading to the furnace 15.

16 indicates an air pump which delivers air into pipe 17 leading to pipe 14. In pipes 13 and 17 are valves 18 and 19.

I prefer to deliver the gas and air under pressures respectively of $1\frac{1}{2}$ pounds and 1 pound, to the square inch, as by so doing I find the best temperature results can be obtained. In order to regulate the pressures of gas and air, the gas pump 12 and air pump 16 are provided with regulating valves 20 and 21. Leading from pipe 17 from the air pump is a pipe 22, and in this pipe is a valve 23.

The furnace 15 may be of any suitable construction, that is—it may be a built-up furnace or a water jacketed furnace, such as are generally used in smelting operations. The drawings, therefore, may be considered diagrammatic of the furnace construction.

The furnace consists in the main of two chambers 25, which I term the "oxidizing chamber", and 26, which I term the "reducing chamber". Surrounding the oxidizing chamber is a feed pipe 27, connected to the pipe 22 leading from the air pump 16, and leading from this pipe 27 are air twyers 29, symmetrically arranged so as to feed into the bottom portion of the chamber. They need not necessarily be so placed; they may be placed further up in the chamber if desired. Surrounding the reducing chamber is a feed pipe 30 to which is connected a series of pipes 31 symmetrically arranged, which pipes may serve either as air pipes or burners, for air and gas as desired, and as will be hereafter explained. The pipe 30 is connected to the pipe 14, which in turn is connected to the pipe 13, leading from the gas pump 11 and the pipe 17 leading from the air pump 16. Connected to the upper part of the oxidizing chamber 25 is a flue 32, leading either to the atmosphere or to any suitable condensing apparatus for the sulfurous acid gas which is delivered through this flue from the furnace.

33 is a door through which ore may be introduced into the chamber 25 or chamber 26.

34 are flues leading from the reduction chamber 26 to the atmosphere or otherwise. In each of these flues is a valve 35.

Arranged under the furnace is the usual forehearth, having a receptacle 36 for slag and 37 for metal.

The method employed and the operation of the improved device is as follows: Heated and fluxed ore is delivered into the chamber 25, and assuming the furnace to be full of ore and the ore to have been previously ignited in any manner, as by the ignition of the gas derived from the gas and air pumps 11 and 16, through burners 31. The air blast from pump 16, delivered through twyers 29, is injected into the mass of ore in chamber 25. Such blast of air, which may be hot or cold, promotes the consumption of the sulfur (pyritic smelting), and also serves to oxidize the iron present, converting it into ferrous or ferric oxid and thereby bringing it into a condition to combine with the flux present. The flux may be any well known flux, preferably an acid flux such as silica—to form a slag. As the sulfur is consumed within the chamber 25, the introduced air necessarily oxidizes a certain part of the copper. There is therefore delivered into the reducing chamber, slag and an oxid of copper, and if all of the sulfur has not been removed from the copper a small percentage of sesqui-sulfid of copper. This body, however, only results when there is an imperfect burning of the sulfur. Ordinarily, as above stated, the copper comes down in the form of an oxid.

It will now be evident to those familiar with the smelting of copper, assuming the sulfur to have been fully removed, that there is no material left in the copper or associated with the copper to maintain the temperature of the copper when in the reducing chamber, and that some extraneous source of heat must be provided. When the copper has reached the reducing chamber, a mixture of gas and air under pressure is delivered through the twyers 31 and ignited. This gas I prefer to mix in the proportions above specified, i. e.,—gas at a pressure of 1½ pounds, and air at a pressure of 1 pound. If the gas derived from the producer is a semi-water gas, i. e.,—a gas having approximately the formula of "Dowson's gas", usually containing $H, CO, CH_4, CO_2$, and $N$, the combined gas and air delivered through the twyers 31 will upon burning, form more carbon dioxid $(CO_2)$ and a compound of hydrogen and sulfur, there still being some excess of carbon monoxid (CO) hydrogen and $(CH_4)$ due to incomplete combustion with the air supplied through the twyers. All three of these gases are reducing gases and will attack the oxygen carried by the copper and reduce the copper to a metallic state, so that it may be removed from the furnace in a practically refined condition.

Of course the character of the copper obtained will depend upon many factors, which will be evident to copper metallurgists, such, for instance, as the management of the oxidizing atmosphere in the chamber 25, the reducing atmosphere in the chamber 26, the character of the fluxes employed, previous treatment of ore, sizes of ore charged into the oxidizing chamber, &c., &c.

I wish it understood that the air introduced into the oxidizing chamber may be either hot or cold; the mixture of air introduced into the reducing chamber may be hot or cold; and the pressures at which these gases are delivered may be varied.

It will be observed from the construction of the furnace described, that the central flue 32 carries sulfurous acid gas, while the side flues 34, which form an easier path for the gases tending to escape from the furnace portion 26, than up through the filling of ore in the lower restricted portion of the furnace portion 25, carry carbonic acid gas and a slight excess of the reducing gases enumerated, due to incomplete combustion, and that these reducing gases and the carbonic acid gas derived from the burning gaseous fuel in the reducing chamber 26 do not pass through the burning fuel in the oxidizing chamber, and, consequently, that the material in the oxidizing chamber is subjected to an oxidizing atmosphere only and the material in the reducing chamber to a reducing temperature only. In the treatment of certain grades of ore it may become necessary to first treat them in the oxidizing chamber, and then submit them to an oxidizing atmosphere in the reducing chamber. This, of course, can be accomplished by shutting off the gas from the gas pump 12 and delivering air only into the reducing chamber from the air pump 16.

While I have described my invention as intended to do away entirely with the use of solid fuel, as for instance, coke, I will point out that it is possible, and may in the treatment of some ores be advisable to use a percentage of coke mingled with the ore in either the oxidizing or the reducing chambers.

Generally, as regards the construction of the furnace, I would have it understood that I do not in any wise limit myself to any particular features of construction, provided such construction permits of the creation of an oxidizing atmosphere in one portion of the furnace and a reducing atmosphere in another portion of the furnace, and these atmospheres caused to act successively upon a body of ore or simultaneously upon different portions of the same body of ore.

Having thus described my invention, I claim:

1. The method described, which consists in subjecting within a furnace structure a body of ignited sulfid ore to the action of a flux and an oxidizing atmosphere, and the oxidized body derived therefrom to the action of a reducing atmosphere of high temperature.

2. The method described, which consists in subjecting simultaneously within a furnace structure a body of ignited sulfid ore to the action of an oxidizing atmosphere, and a body of oxidized ore to the action of a reducing atmosphere of high temperature.

3. The method described, which consists in subjecting within a furnace structure a body of ignited sulfid ore to the action of an air blast and the oxidized body derived therefrom to the action of a high temperature ignited reducing gas delivered under pressure.

4. The method described, which consists in first igniting a sulfid ore to burn out its sulfur contents and simultaneously subjecting it to an oxidizing atmosphere to oxidize its iron and copper contents, and subsequently subjecting the oxidized copper to the action of a reducing atmosphere of high temperature to reduce it to a metallic state.

5. The method described, which consists in simultaneously burning the sulfur from a sulfid ore containing copper and iron and oxidizing the iron and copper contents thereof, and subsequently simultaneously heating the derived copper oxid in a reducing atmosphere and reducing it to a metallic condition.

6. The method described of smelting a sulfid ore containing copper and iron, which consists in simultaneously burning the sulfur of the copper, oxidizing the iron and copper contents, and fluxing the oxidized iron to form slag, and subsequently simultaneously heating the oxidized copper in a reducing atmosphere and reducing it to a metallic condition.

7. The herein described method of smelting copper ores in a single furnace structure, which consists in first oxidizing the copper of the ore, and then reducing the oxid to the form of a metal independently from said first oxidization.

8. The herein described method, which consists in first subjecting the heated and fluxed ore to the action of heat generated by the chemical change of one of its elements and the action of an oxidizing atmosphere, and the copper body derived therefrom to the action of externally derived heat and a reducing atmosphere.

9. The method described of smelting a sulfid ore containing copper and iron, which consists in simultaneously decomposing the ore to form sulfurous acid gas, copper oxid, and iron oxid, and fluxing the iron oxid to form a slag, and finally reducing the copper oxid to form metallic copper.

10. The method described, which consists in subjecting within a furnace structure an ignited body of sulfid ore to the action of a flux and an oxidizing atmosphere only, and subsequently the copper oxid derived therefrom to the action of a high temperature reducing gas only.

In testimony whereof, I affix my signature, in the presence of two witnesses.

GEORGE HILLARD BENJAMIN.

Witnesses:
FREDERICK A. BLOUNT,
FRANK O'CONNOR.